Aug. 15, 1950      J. B. DICKSON      2,518,669
LICENSE PLATE MOUNTING
Filed July 27, 1946
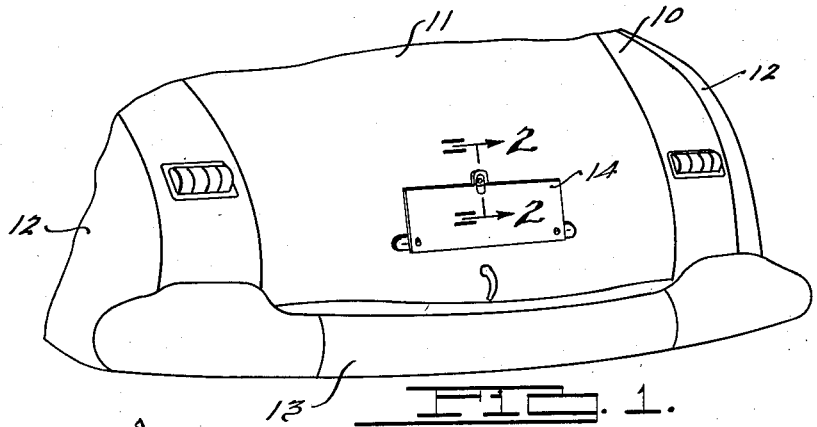
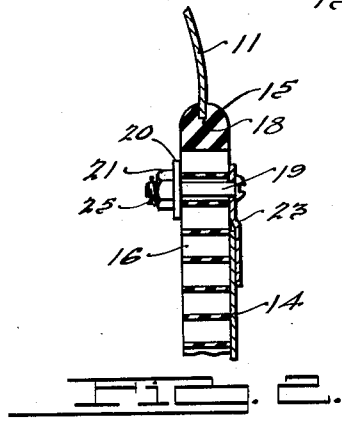
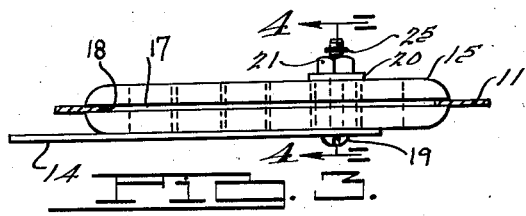
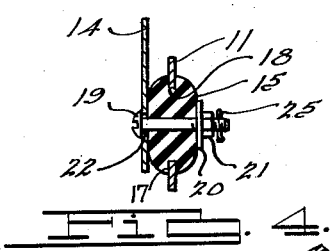
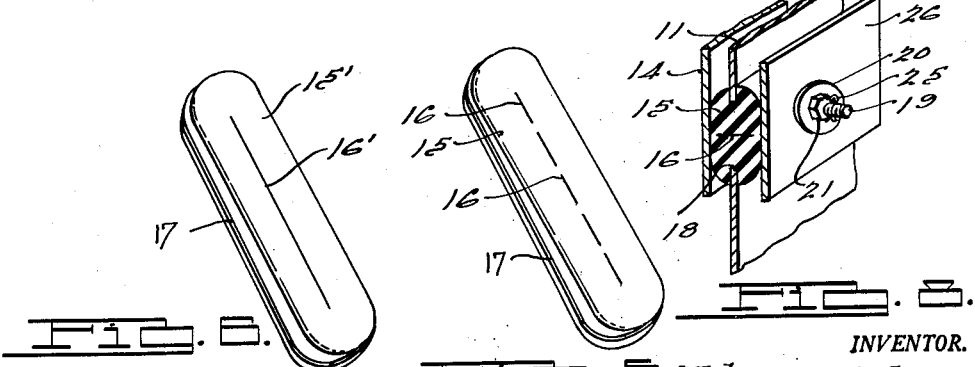
INVENTOR.
John B. Dickson.
BY
Harness and Harris
ATTORNEYS.

Patented Aug. 15, 1950

2,518,669

UNITED STATES PATENT OFFICE 2,518,669

LICENSE PLATE MOUNTING

John B. Dickson, Highland Park, Mich., assignor to Chrysler Corporation, Highland Park, Mich., a corporation of Delaware Application July 27, 1946, Serial No. 686,796

1 Claim. (Cl. 40—125)

This invention relates to means for removably securing an object to a relatively flat surface and more particularly to means for providing a water-tight connection between two flat elements by the cooperation of rubber-like material, the elements, and a fastening device.

The invention will be described in connection with an automotive vehicle and the usual license plate affixed thereto as this is a typical use thereof although it is to be understood that other applications of the invention can be made.

Heretofore, it has been customary to provide metal brackets on the exterior surface of automobile bodies so that the usual annual State license plates may be affixed thereto. The brackets are unsightly in appearance and retain the license plate a considerable distance from the surface of the vehicle body. It is an object of my invention to provide a plurality of flexible water tight elements in the vehicle body surface and to which the license plate may be secured to be retained substantially flush with the vehicle body.

It is a further object of my invention to provide a license plate mounting which will not rattle.

An additional object of the invention is to so associate the components that tightening the fastening device deforms the rubber-like material to improve the seal against penetration of water.

An additional object is to provide a mounting for a vehicle license plate that prevents the removal of the license plate by any person who does not have access to the luggage compartment.

In the drawings:

Fig. 1 is a perspective view of the rear portion of an automobile showing a license plate mounted thereon with my invention;

Fig. 2 is a section on the line 2—2 of Fig. 1;

Fig. 3 is a top plan view of one mounting element and the license plate;

Fig. 4 is a section on the line 4—4 of Fig. 3;

Fig. 5 is a perspective view of the mounting element;

Fig. 6 is a perspective view of a modified form of the mounting element;

Fig. 7 is a view of a preferred type of screw; and

Fig. 8 is a perspective view of a vertical section taken through one combination of mounting elements.

The invention is illustrated herein as applied to a license plate mounting on an automobile as a typical application thereof and in Fig. 1 the rear portion of a conventional automobile 10 is illustrated as comprising a luggage compartment lid forming a surface panel 11, fenders 12, and bumper 13. A license plate 14 is mounted on the exterior surface of the luggage compartment lid by means to be described herein.

Fig. 5 illustrates in perspective one form of mounting element 15. The element 15 is formed of a distortable rubber-like material and is flat and elongated in shape with a series of aligned openings 16 extending substantially throughout its length along its axis. The element 15 has an annular groove 17 which is parallel to its flat surfaces and extends around its longitudinal periphery. The groove 17 is adapted to receive portions of the luggage compartment lid 11 therein so that the element may be secured to the deck lid. The plurality of aligned openings are provided to offer a selection of location for a screw or other fastening means which is to penetrate the element in a manner to be described herein.

The drawings show the license plate 14 secured to the luggage compartment lid 11 at three places. The number or location of the fastening devices may be changed without departing from my invention. At each of the places where it is desired to secure a portion of the license plate to the luggage compartment lid the latter is provided with an elongated opening 18 of a contour adapted to receive the mounting element 15 therein so that element 15 fills opening 18 and the portions of the lid bordering the opening 18 may be received in the annular groove 17 of the mounting element 15. If desired a glue or bonding may be utilized to further secure the mounting element to the deck lid.

In Figs. 3 and 4 a threaded screw 19, a washer 20, and a nut 21 cooperate to secure the license plate 14 to the mounting element 15. The screw 19 penetrates the usual opening 22 in the license plate and one of the openings 16 in the mounting element and the washer and nut are assembled on the screw 19 on the opposite side of the mounting element from the license plate as illustrated in Fig. 4. As explained above, a plurality of openings 16 are provided so that a choice of locations for screw 19 is available. A long continuous opening 16' may be substituted for the plurality of separate openings if desired as shown in Fig. 6 although the Fig. 5 form is preferred. The portions of mounting element 15 disposed between openings in the Fig. 5 form stabilize the mounting element and tend to overcome any tendency of the screw 19 to distort the mounting element by dragging a portion thereof along with the screw when the latter is inserted.

The distortion of the rubber-like element 15 caused by the penetration of the screw 19 through slot 16 which has a width substantially less than the diameter of screw 19 and the reaction of the lid 11 which retains the periphery of the element 15 within the contour of the opening 18 cooperate to secure a water-tight seal around the screw 19. The rubber element 15 is distorted an amount sufficient to accommodate the volume of that portion of the screw which is retained therein. The luggage compartment lid 11 surrounding the opening 18 prevents this distortion of the rubber element 15 from deforming the periphery of the element 15. Therefore, the opening 16 in element 15 adjacent screw 19 is effectively sealed around the screw 19. In addition the tightening of nut 21 and washer 20 on screw 19 exerts a lateral distortion of the element that produces a further sealing in the vicinity of the screw 19. This prevents water from entering the luggage compartment to harm articles carried therein or to initiate rusting thereof.

If desired, a cotter pin 25 may be inserted through a small hole provided on the inner end of the screw 19 to lock the screw against removal by an unauthorized person who does not have access to the luggage compartment to remove the cotter pin. Fig. 8 illustrates a further safeguard against theft that may be used if desired. A supplemental plate 26 of sufficient size so that it cannot be drawn through opening 18 may be secured against element 15 on screw 19 provided with cotter pin 25. The plate 26 will thwart any effort to remove the license plate by digging out the rubber element 15 and pulling the screw, washer and cotter pin through the opening 18.

It has been found that sheet metal screws like that illustrated at 27 in Fig. 7 are particularly easy to insert through the element 15. A sheet of metal similar to that illustrated at 26 in Fig. 8 with a preformed hole adapted for cooperation with the screw may be used as a backing plate or "nut." It is to be understood that while reference has been made to the use of a screw, other mechanical equivalents thereof could be substituted without departing from my invention.

As shown in Fig. 2 the upper mounting element has been illustrated as utilizing a license plate engaging tab 23 rather than a direct penetration of the license plate by the screw 19. This is a matter of choice and could be applied to all mounting elements if desired.

I claim:

In a motor vehicle a surface panel having a preformed opening therein and means for supporting an identifying plate upon said panel comprising a rubber-like mounting element having an annular groove extending around its periphery and adapted to fill said opening with portions of said panel received in its groove, said element having a slot therein and a screw fastening device having a diameter substantially greater than the width of said slot and adapted to penetrate said slot to secure said plate to said element and said panel and to directly contact and distort said element laterally to effect a watertight seal around the edges of said preformed opening and around the periphery of said fastening device.

JOHN B. DICKSON.

REFERENCES CITED

The following references are of record in the file of this patent:

UNITED STATES PATENTS

| Number | Name | Date |
|---|---|---|
| 1,587,484 | Holden | June 1, 1926 |
| 1,809,465 | Wheeler | June 9, 1931 |
| 1,892,943 | Geyer | Jan. 3, 1933 |
| 2,098,156 | Nielsen | Nov. 2, 1937 |

Certificate of Correction

Patent No. 2,518,669 August 15, 1950

JOHN B. DICKSON

It is hereby certified that error appears in the printed specification of the above numbered patent requiring correction as follows:

Column 2, line 15, strike out the word "longitudinal" and insert the same before "axis", line 13, same column;

and that the said Letters Patent should be read as corrected above, so that the same may conform to the record of the case in the Patent Office.

Signed and sealed this 28th day of November, A. D. 1950.

[SEAL]

THOMAS F. MURPHY,
*Assistant Commissioner of Patents.*